Patented July 1, 1941

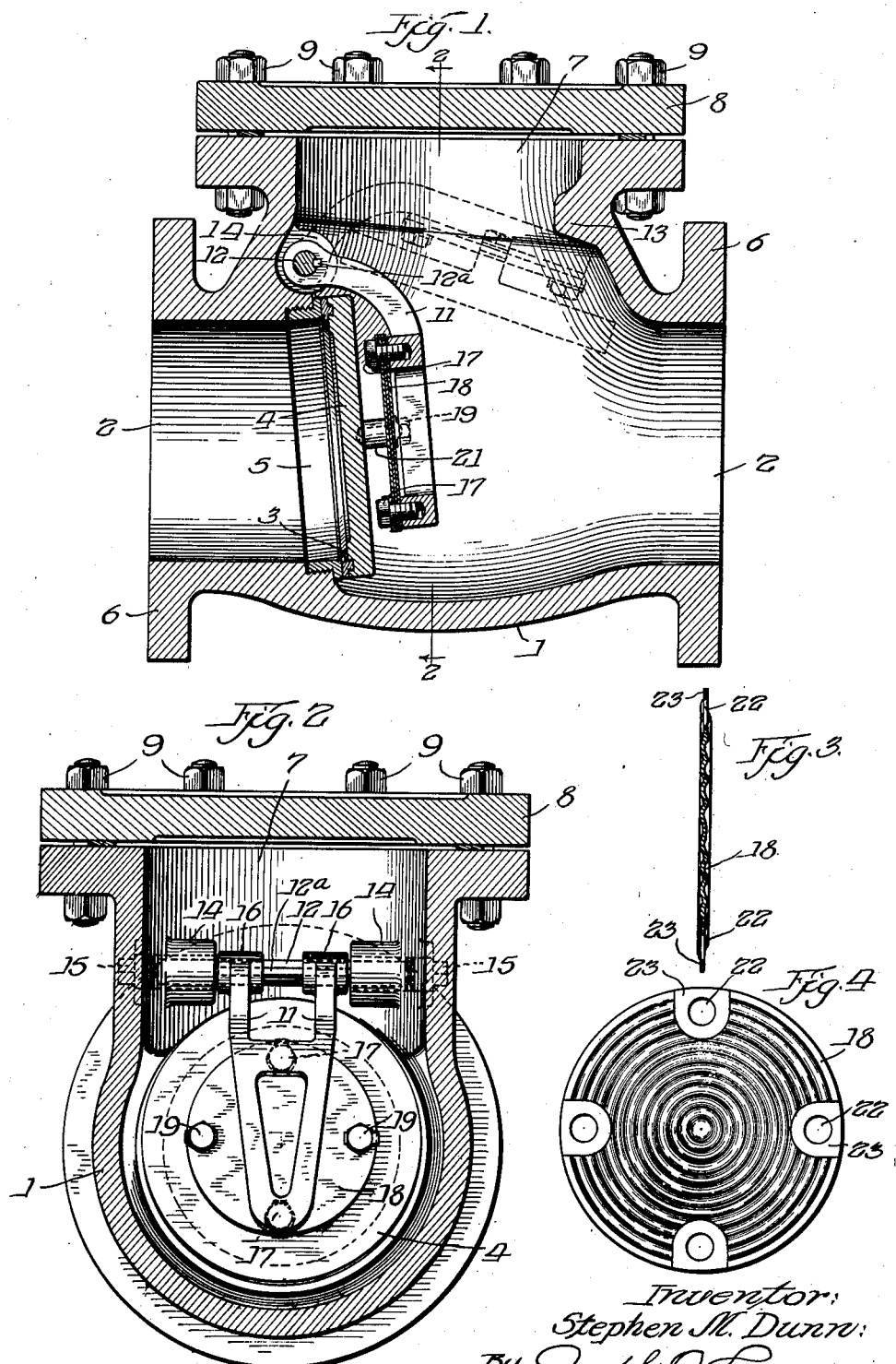

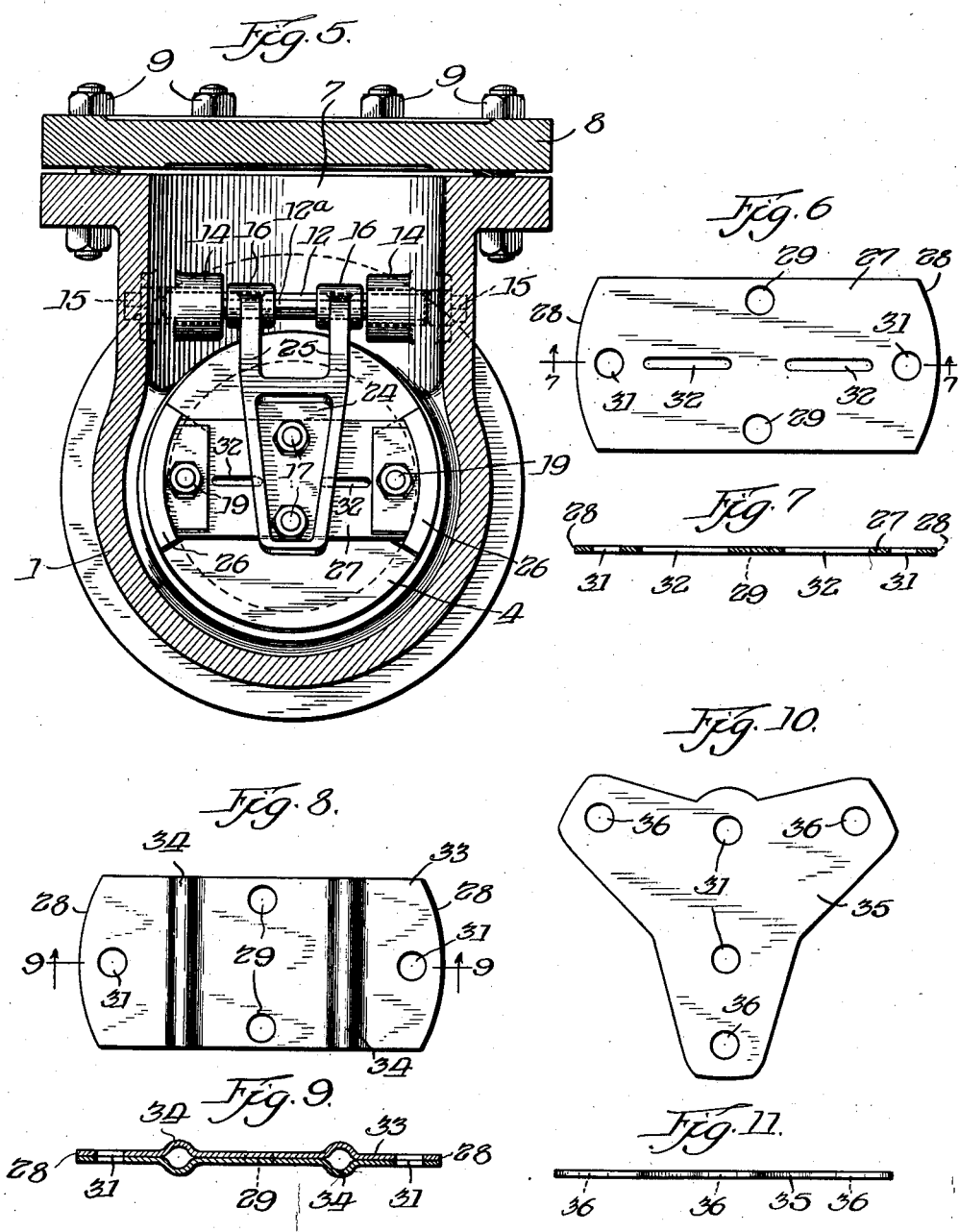

2,247,773

UNITED STATES PATENT OFFICE 2,247,773

VALVE

Stephen M. Dunn, Los Angeles, Calif.

Application February 15, 1939, Serial No. 256,407

4 Claims. (Cl. 251—123)

My invention relates to a swing check valve construction and, more particularly, is applicable to a flexible hinge and closure member coupling for the valve.

In the art of valves it is well known that under ordinary conditions and for the most satisfactory operation of the valve, it is preferable that the closure member or disc should not be rigidly attached to its operating or guiding member. A relatively loose or universal attachment of the disc permits the latter to find its seat and to automatically adjust itself to the seat thereby enhancing the chances of obtaining a fluid-tight closing of the valve proper. In the usual type of disc connection, considerable wear frequently occurs at the universal joint whereby the disc or closure member becomes too loose at the connection for the satisfactory operation of the valve.

It is therefore an object of my invention to provide a relatively simple and practical means for attaching a valve disc to its operating member, such as, for example, a hinge, in which the disc is permitted slight universal movement without subjecting the disc-hinge connection to the objectionable wear alluded to.

A further object of my invention is to provide a flexible disc-hinge connection which acts as a cushioning means or shock absorber thereby relieving the various parts of the valve of the excessive stresses that would otherwise be induced by a sudden stopping of the entire mass of the disc and its operating member when the disc contacts the seat during the operation of closing the valve.

Other objects and advantageous features, some of which with those enumerated, will be set forth and will become more readily apparent in connection with the following description of the preferred embodiments of the invention illustrated in the drawings accompanying and forming a part of this specification.

In the drawings:

Fig. 1 is a vertical sectional side view of a valve embodying my invention.

Fig. 2 is a view taken on the line 2—2 of Fig. 1.

Fig. 3 is a sectional view of a flexible attachment plate.

Fig. 4 is a plan view of the attachment plate shown in Fig. 3.

Fig. 5 is a vertical sectional end view similar to Fig. 2 showing a modification of my invention.

Fig. 6 is a detail plan view of the modified attachment plate shown in the valve in Fig. 5.

Fig. 7 is a view taken on the line 7—7 of Fig. 6.

Fig. 8 is a plan view of another modified attachment plate.

Fig. 9 is a view taken on the line 9—9 of Fig. 8.

Fig. 10 is a plan view of a still further modified attachment plate.

Fig. 11 is an elevation of the modified attachment plate shown in Fig. 10.

Like reference characters refer to like parts throughout the various views of the drawings.

In terms of broad inclusion, the valve of the present invention may be representative of a number of types which are suitable for different kinds of service. However, as shown in Fig. 1, I prefer to disclose my invention as it may be embodied in a swing check type of valve in which the disc or closure member is mounted upon a hinge member, the latter being pivotably secured within the valve body or casing as hereinafter described in greater detail.

The valve body or casing generally designated 1 is of the usual type having a longitudinal through passageway 2 provided with a seat 3 for the disc or closure member 4. Preferably, but not necessarily, the seat 3 comprises a flanged bushing 5 removably secured within the body 1. The ends of the body 1 are provided with conventional means for attaching the valve to a pipeline and for that purpose the flanges 6 are shown. However, other means, if desired, may be employed for such connection. The upper portion of the body 1 has the flanged opening 7 normally closed by the blind flange or cap 8 secured to the valve by a plurality of bolts or studs 9. The hinge 11 having its upper end preferably keyed to the pin or rotatable shaft 12, the latter being mounted within the valve body transverse to the run of the valve, carries the disc 4 which is attached to the lower or free end of the hinge 11. When the valve is in the open or flow-permitting position, as shown by the dash lines (Fig. 1), a portion of the hinge 11 projects upwardly into the opening 7 with the free end of the hinge abutting the shoulder 13 thereby positioning the disc for an immediate return to the seat 3 in the event of a reversal of the fluid flow through the valve.

Referring now to Fig. 2, a pair of apertured bosses 14 are provided in the valve body which receive the ends of the pin 12 with suitable clearances to allow for the rotational movement of the pin ends within the apertures of the bosses. The outermost ends of the apertures in the bosses 14 are preferably closed wtih the removable plugs 15. The upper end of the hinge 11 is bifurcated and provided with apertured hubs 16 through which the pin 12 extends and, as previously explained, the parts are keyed as at 12a to prevent relative movement therebetween. The lower or free end of the hinge 11 is suitably provided with a plurality of cap screws 17 serving to attach and hold securely one or more flexible plates 18 which may be either of metal, composition, treated fabric or any other material dependent upon the service intended.

It will be noted, as shown more clearly in Fig. 1, that the plates 18 are thus attached to the hinge 11 by the cap screws 17 extending through diametrically opposed apertures in the plates. Similar cap screws 19 extend through suitable diametrically opposed holes in the plates 18 placed at right angles to the first mentioned holes and secure the plates to the projections 21 on the back side of the disc 4. It can therefore readily be understood that the flexible plates 18 in serving as the attaching means for the closure member with relation to the hinge will permit universal movement of the disc in finding its seat and also will allow for the relief or minimizing of the shock and jar normally present in valves of this type at the instant of closing. In the latter connection it will be noted further that the plate means or diaphragm is so positioned with relation to the closure member that it extends in a plane which is removed from but substantially parallel to the seat portion of the closure member, particularly having in mind the position of the latter with relation to the axis of the valve proper at the instant of seating.

The flexible plates which I employ in my invention obviously may be formed in a variety of shapes. In Figs. 3 and 4, for example, I have shown a circularly corrugated plate 18 having four 90-degree spaced apart holes 22 each preferably surrounded by an uncorrugated portion 23, the latter thereby providing a bearing surface for the underside of a cap screw head. The plate 18, either singly or in plurality, is suitable for installation in the valve shown and described in connection with Fig. 1.

Other forms of flexible plates may require changes in the shape of the disc and/or the hinge. Instead of placing the cap screws 17 in the apex and cross-bar of the inverted A frame hinge 11 as shown in Figs. 1 and 2, the said cap screws in Fig. 5 are placed within a recess 24 in the free end of the modified hinge 25. The projections 26 serve the same purpose that the projections 21 serve but are altered to conform to and be more suitable for the particular shape of the flexible plates 27.

In the latter connection, Figs. 6 and 7 show in detail the form of plate 27 which is essentially rectangular having the ends 28 arcuately curved to conform to the periphery of the disc 4. The holes 29 and 31 are provided to allow respectively for the cap screws 17 and 19 to extend therethrough and the elongated apertures or slots 32 are provided to increase the flexibility of the plate.

In Figs. 8 and 9, the plate 33 is a further modification of the plate 27; the flexibility of the plate 33 is partially constrained however by the parallel bent or corrugated portions 34 which make the plates adaptable for assembly in pairs as shown more clearly in Fig. 9.

Referring to Figs. 10 and 11, a still further modification of the flexible plate is shown in which the plate 35 is of a Y shape providing for three points of attachment to the disc by cap screws extending through the holes 36. The holes 31 are for attachment by cap screws to the hinge 25. Obviously, the number of projections 26 on the disc or closure member 4 must be increased to three and their location on the disc arranged at angles of 120-degrees for suitable attachment of the plate 35 thereto.

It will be noted that while my invention provides a means for allowing universal movement between the disc and the hinge, it also provides means for restricting the universal movement of the disc generally and means for permitting greater movement in one direction than in the other.

My invention is capable of many modifications which will readily occur to those skilled in the art; the particular form of the various elements involved is not essential, as it is obvious that variations could be used without departing from the spirit of the invention.

I intend, therefore, to be limited only by the scope of the appended claims.

I claim:

1. A check valve comprising a casing having a fluid passageway therethrough, a closure member for the passageway, a hinge member for the said closure member, a flexible plate-like member extending substantially in a plane parallel to the plane of seating of the closure member with the casing and positioned between the said hinge and closure members serving thereby to connect the said closure member with the said hinge member, the said plate-like member being arranged in spaced-apart relation to the said closure member, providing for a fixed, flexible connection therebetween whereby the wear due to repeated impact and normally occurring in the connection between the said hinge and closure members is substantially reduced.

2. A check valve comprising a casing having a fluid passageway therethrough, a closure member for the passageway, a hinge member for the said closure member, flexible plate-like means having faces extending in a plane substantially parallel to the plane of seating of the closure member with the said casing and positioned between the said hinge and closure members, the said plate-like means being fixedly attached to one of the said latter members and in spaced-apart relation to at least one of said members, the central portion of the said plate-like means serving to couple the said closure member with the said hinge member, the said latter means of attachment providing for a fixed, axially deflectable connection between the said hinge and closure members.

3. A check valve comprising a casing having a fluid passageway therethrough, a closure member for the passageway, a hinge member for the said closure member, a flexible diaphragm member extending in spaced-apart relation to the said closure member and in a plane substantially parallel to the plane of seating of the closure member with the said casing, the said diaphragm member having a substantially central connection with one of the said latter members and an outer end connection with the other of said members, the said diaphragm member providing for a fixed, flexible connection between the said hinge and closure members with limited deflection axially therebetween.

4. A check valve comprising a casing having a fluid passageway therethrough, a closure member for the passageway, a hinge member for the said closure member, a flexible plate-like member positioned in spaced-apart relation between the said hinge and closure members and extending in a plane substantially parallel to the plane of seating of the closure member with the casing, the said plate-like member being fixedly attached respectively to the said hinge and closure members thereby coupling the said closure member with the said hinge member, the said plate-like member being substantially unsupported between said means of attachment whereby limted transverse movement of a central portion of the plate-like member is provided to permit slight axial deflection thereof.

STEPHEN M. DUNN.